(12) United States Patent
Yanai et al.

(10) Patent No.: US 6,235,426 B1
(45) Date of Patent: May 22, 2001

(54) NONAQUEOUS ELECTROLYTE SECONDARY CELL WIT PTC CURRENT COLLECTOR TABS

(75) Inventors: Atsushi Yanai; Kazunari Ohkita; Katsunori Yanagida; Takeshi Maeda; Atsuhiro Funahashi; Yoshito Chikano; Toshiyuki Nohma; Ikuo Yonezu; Koji Nishio, all of Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/398,209

(22) Filed: Sep. 17, 1999

(30) Foreign Application Priority Data

Sep. 21, 1998 (JP) .................................................. 10-266749
Dec. 9, 1998 (JP) .................................................. 10-349535

(51) Int. Cl.$^7$ ..................................................... H01M 4/66
(52) U.S. Cl. ........................... 429/211; 429/62; 429/178; 429/245; 429/324
(58) Field of Search .............................. 429/62, 211, 233, 429/245, 178, 324

(56) References Cited

U.S. PATENT DOCUMENTS

| | | | |
|---|---|---|---|
| 4,855,195 | * | 8/1989 | Georgopoulos et al. . |
| 4,971,867 | | 11/1990 | Watanabe et al. . |
| 5,534,369 | * | 7/1996 | Nagaura . |
| 5,783,326 | | 7/1998 | Hasebe . |

FOREIGN PATENT DOCUMENTS

| | | |
|---|---|---|
| 52-53929 | 4/1977 | (JP) . |
| 5-74493 | 3/1993 | (JP) . |
| 5-182647 | 7/1993 | (JP) . |
| 6-267528 | 9/1994 | (JP) . |
| 7-220755 | 8/1995 | (JP) . |

\* cited by examiner

Primary Examiner—John S. Maples
(74) Attorney, Agent, or Firm—Arent Fox Kintner Plotkin & Kahn, PLLC

(57) ABSTRACT

A nonaqueous electrolyte secondary cell having a rolled-up electrode unit housed in a cell can and comprising a positive electrode and a negative electrode each formed by coating a surface of a striplike current collector with an electrode material. According to a first embodiment, the current collector of at least one of the positive electrode and the negative electrode comprises a plurality of current collector pieces 42 arranged along one direction and a PTC element 5 interconnecting each pair of adjacent current collector pieces 42. Alternatively with a second embodiment, at least one of the positive electrode and the negative electrode comprises a PTC element held between opposed faces of an uncoated portion of the current collector thereof and a base end portion of a current collector tab. The PTC element serves to prevent continuous occurrence of a current in excess of a predetermined value and realizes a high energy density.

1 Claim, 8 Drawing Sheets

US 6,235,426 B1

NONAQUEOUS ELECTROLYTE SECONDARY CELL WIT PTC CURRENT COLLECTOR TABS

FIELD OF THE INVENTION

The present invention relates to nonaqueous electrolyte secondary cells which comprise a can and a rolled-up electrode unit housed in the can and serving as an electricity generating element, and more particularly to nonaqueous electrolyte secondary cells which are adapted to promptly suppress a current exceeding a predetermined value when the excessive current occurs.

BACKGROUND OF THE INVENTION

In recent years, attention has been directed to lithium secondary cells or batteries which are adapted for a greater capacity and higher energy density for use as power sources for electric motor vehicles or hybrid cars. For example, FIGS. 5 and 6 show a cylindrical lithium secondary cell which comprises a cylindrical cell can 1 having a cylinder 11 and lids 12, 12 welded to the respective ends thereof, and a rolled-up electrode unit 2 encased in the cell can 1. A pair of positive and negative electrode terminal assemblies 9, 9 are attached to the lids 12, 12, respectively. The rolled-up electrode unit 2 is connected to the terminal assemblies 9, 9 by a plurality of current collector tabs 3, whereby the electric power generated by the electrode unit 2 can be delivered to an external device from the pair of terminal assemblies 9, 9. Each lid 12 is provided with a gas vent plug 13.

With reference to FIG. 7, the rolled-up electrode unit 2 comprises a positive electrode 23 containing a lithium containing composite oxide, a negative electrode 21 containing a carbon material, and a separator 22 impregnated with a nonaqueous electrolyte and interposed between the electrodes, the assembly of these components 21 to 23 being rolled up into a cylinder. A plurality of current collector tabs 3 outwardly extend from each of the positive electrode 23 and the negative electrode 21 of the unit 2, and the outer ends 31 of the current collector tabs 3 of the same polarity are joined to one electrode terminal assembly 9. For convenience, sake, only some of these tabs are shown as being joined at their outer ends to the terminal assembly 9 in FIG. 6, while the outer ends of the other tabs connected to the assembly 9 are omitted from the illustration.

The electrode terminal assembly 9 comprises a screw member 91 extending through a hole in the lid 12 of the cell can 1 and mounted on the lid 12. The screw member 91 has a flange 92 at its base end. An insulating packing 93 is fitted in the hole of the lid 12 for electrical insulation and effective sealing. The screw member 91 has a washer 94 fitted therearound from outside the cylinder 11, and a first nut 95 and a second nut 96 screwed thereon similarly. The first nut 95 is tightened up to clamp the insulating packing 93 between the flange 92 of the screw member 91 and the washer 94 and thereby seal off the hole more effectively. The outer ends 31 of the current collector tabs 3 are secured to the flange 92 of the screw member 91 by laser welding or ultrasonic welding.

For connecting the current collector tab 3 to the negative electrode 21 or positive electrode 23 of the rolled-up electrode unit 2, a current collector strip forming the electrode and coated with an electrode material over a surface has a known structure comprising a portion of the surface not coated with the electrode material and having the base portion of the current collector tab secured thereto by laser welding or ultrasonic welding (JP-A No. 267528/1994).

When the nonaqueous electrolyte secondary cell described develops a short-circuit in its interior, a great current is likely to flow. To avoid such an incidence, an electrode structure has been proposed. For example, a positive electrode 8 comprises, as shown in FIG. 8, a current collector 81 which is provided with an electrode material 83 over each of its opposite surfaces, with a PTC (positive temperature coefficient) element layer 82 formed therebetween (JP-A No.220755/1995). The PTC element providing the layer 82 has a positive temperature coefficient of resistance, such that when a current in excess of a predetermined value flows therethrough, the electric resistance value of the element rapidly increases to exhibit a current suppressing effect. When the secondary cell having the proposed electrode structure develops an inside short-circuit, a current exceeding the predetermined value will not flow continuously.

However, in the case of the conventional nonaqueous electrolyte secondary cell having the PTC element layer 82 shown in FIG. 8, the presence of the PTC element layer 82 between the current collector 81 and the electrode material 83 makes the quantity of the electrode material 83 correspondingly smaller than otherwise per unit volume of the cell can, consequently entailing the problem of greatly reducing the discharge capacity per unit volume of the cell can, i.e. energy density.

SUMMARY OF THE INVENTION

An object of the present invention is to provide a nonaqueous electrolyte secondary cell which is adapted to prevent continuous occurrence of a current exceeding a predetermined value and realize a high energy density.

The present invention provides a nonaqueous electrolyte secondary cell which has an electrode unit 2 housed in a cell can 1 and comprising a positive electrode and a negative electrode each including a current collector. The cell is characterized in that the current collector of at least one of the positive electrode and the negative electrode comprises a plurality of current collector pieces 42 arranged along one direction and a PTC element 5 interconnecting each pair of adjacent current collector pieces 42.

With the secondary cell of the invention stated above, the PTC element 5 is interposed between each pair of adjacent current collector pieces 42 and can therefore be given a minimum length necessary for interconnecting the collector pieces 42. This greatly reduces the volume occupied by such PTC elements 5 in the interior of the cell can 1 unlike the conventional construction wherein a PTC element layer is interposed between the current collector and the electrode material, consequently permitting use of a larger amount of electrode material than conventionally to result in an energy density as high as is the case with cells having no PTC element.

Stated more specifically, end portions of the pair of current collector pieces 42, 42 to be interconnected are lapped over each other, with the PTC element 5 held therebetween, and joined to respective opposite surfaces of the PTC element 5. With this specific structure, the joint between the PTC element 5 and each current collector piece 42 can be given a sufficiently large area, whereby the adjacent current collector pieces 42 can be connected to each other firmly.

The number A of current collector pieces 42, the overall length B of the electrode along the winding direction of the electrode unit 2 and the length C of the PTC element 5 have the relationship represented by the following expression:

$$A \times C/B < 0.1$$

When this relationship is established, a much greater discharge capacity than in the prior art is available as will be substantiated by experimental results to be described later.

The present invention further provides another nonaqueous electrolyte secondary cell including an electrode unit 2 housed in a cell can 1 and comprising a positive electrode and a negative electrode each provided by coating a surface of a striplike current collector 61 with an electrode material 62 to form coated portions and an uncoated portion not coated with the electrode material 62, a current collector tab 3 having a base end portion connected to the uncoated portion and an outer end portion connected to an electrode terminal assembly 9. At least one of the positive electrode and the negative electrode is provided with a PTC element 7 held between opposed faces of the uncoated portion of the current collector 61 thereof and the base end portion of the current collector tab 3.

With the secondary cell of the invention described above, the PTC element 7 is provided between the uncoated portion of the current collector 61 and the current collector tab 3 and can therefore be given a length equal to the width of the current collector tab 3. This greatly reduces the volume occupied by such PTC elements 7 in the interior of the cell can 1 unlike the conventional construction wherein a PTC element layer is interposed between the current collector and the electrode material, consequently permitting use of a larger amount of electrode material than conventionally to result in an energy density as high as is the case with cells having no PTC element.

Stated specifically, the PTC element 7 has a thickness in the range of 10 μm to 500 μm. When the PTC element 7 has a thickness in this range, the cell has a sufficient current suppressing effect and a greater discharge capacity than in the prior art as will be substantiated by experimental results to be described later.

The present invention further provides another nonaqueous electrolyte secondary cell which includes a plurality of current collector tabs each of which is partly or entirely made of a PTC element. When the current flowing through one of the PTC element portions constituting the current collector tabs in the secondary cell increases or one of the PTC element portions rises in temperature, the electric resistance of the particular PTC element portion rapidly increases, permitting little or no current to flow through the portion, whereby the cell current is cut off.

Proposals have been made of a secondary cell wherein a single PTC element is connected between the positive electrode and the positive electrode external terminal (JP-U No. 53929/1977), and a secondary cell having an opening closure plate which is made of a PTC element (JP-A No. 74493/1993). However, since the allowable current value of one PTC element is, for example, as small as about 5 A, these secondary cells can not be charged with a great current, and the PTC element is not usable in large secondary cells.

On the other hand, the nonaqueous electrolyte secondary cell of the invention, wherein the plurality of PTC elements are connected in parallel, can be charged with a great current having a value obtained by multiplying the allowable current value of the PTC element by the number of PTC elements, so that the invention can be embodied as large secondary cells.

Further when the rolled-up electrode unit of the conventional secondary cell described locally rises in temperature, the conduction of heat from the location of rise of temperature to the PTC element takes time, hence the problem of delayed current cutoff.

With the secondary cell embodying the present invention, the electrode unit is, for example, a rolled-up electrode unit wherein a plurality of PTC elements are arranged as distributed longitudinally of each of the positive and negative electrodes of the unit. If a rise in temperature occurs at a portion along the length of the positive or negative electrode, the electric resistance of the PTC element in the vicinity of the portion rapidly increases to block the current through the PTC element almost completely. Thus, the current is cut off promptly.

The nonaqueous electrolyte secondary cell embodying the invention is adapted to prevent continuous occurrence of a current exceeding a predetermined value and is given a high energy density as already stated.

DETAILED DESCRIPTION OF EMBODIMENTS

Figure 5:
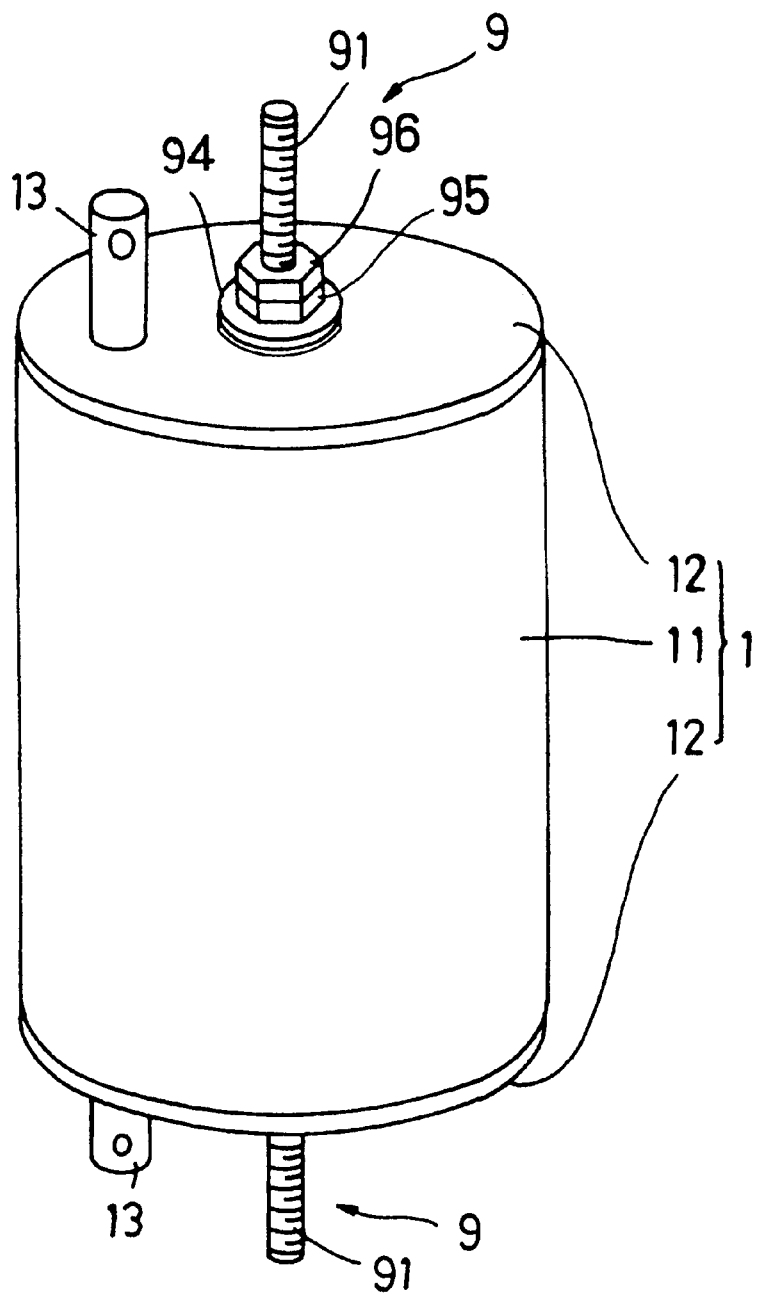
FIG. 5 is a perspective view showing the appearance of a cylindrical secondary cell.

Cylindrical lithium secondary cells embodying the present invention will be described below in detail with reference to the drawings. While the secondary cells of the invention include those wherein the positive electrode only is given a current suppressing function by PTC elements, both the positive electrode and the negative electrode or the negative electrode only can alternatively be given the current suppressing function similarly. The secondary cells embodying the invention have the same construction as the cell shown in FIGS. 5 and 6 with the exception of the rolled-up electrode unit 2 and the current collector tabs 3, so that the same construction will not be described repeatedly.

First Embodiment

Figure 1:
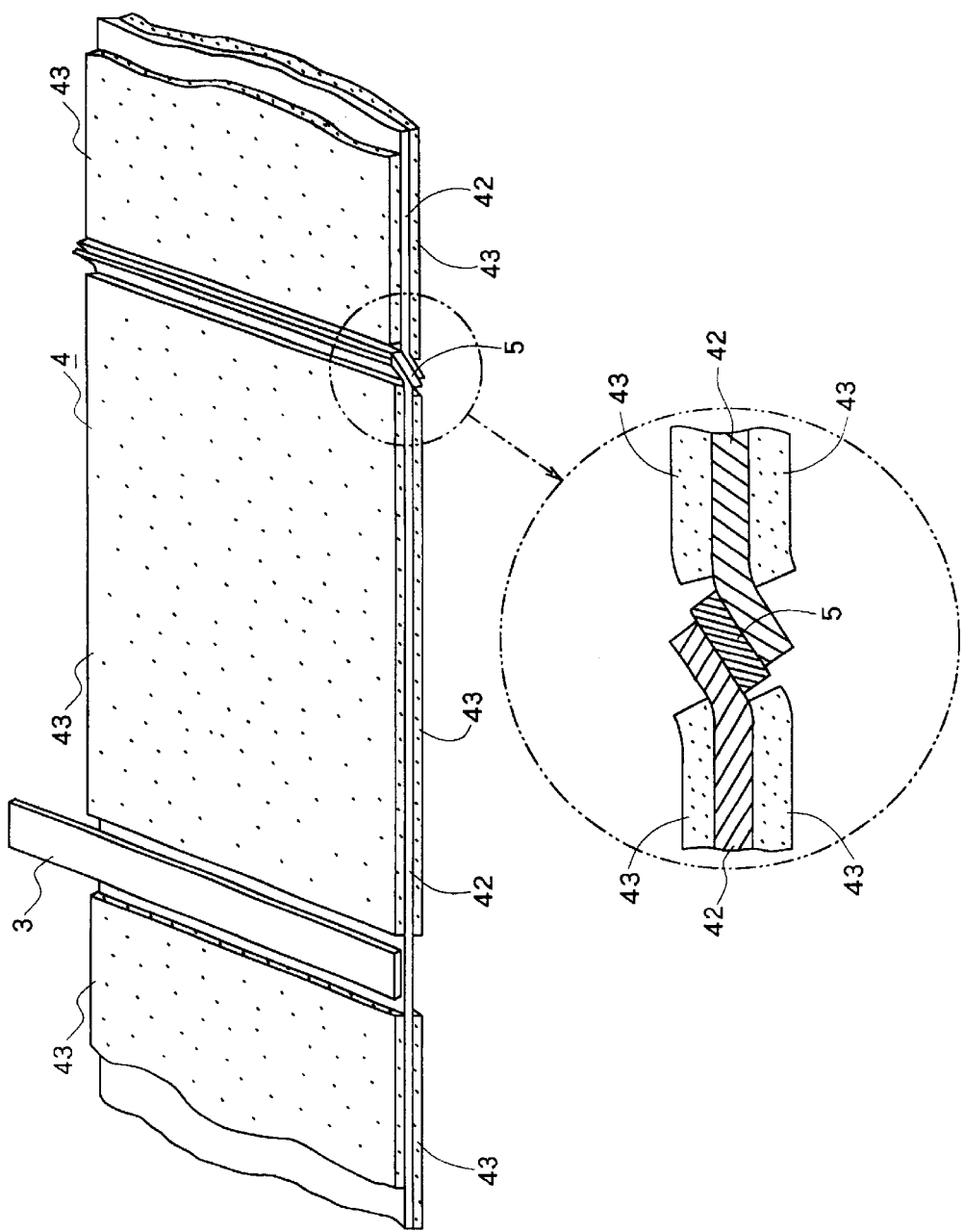
FIG. 1 is a fragmentary perspective view showing a positive electrode for use in a cell as a first embodiment of the invention.

With reference to FIG. 1, the secondary cell of this embodiment has a positive electrode 4 which comprises a plurality of current collector pieces 42 arranged in the direction of winding for forming a rolled-up electrode unit, an electrode material 43 coating opposite surfaces of each current collector piece 42, and a PTC element 5 in the form of a strip and interconnecting each pair of adjacent current collector pieces 42. The surface of the current collector piece 42 has portions coated with the electrode material 43, and uncoated portions not coated with the electrode material 43. A current collector tab 3 is joined at its base end portion to the uncoated portion.

As shown on an enlarged scale in FIG. 1, each pair of adjacent current collector pieces 42, 42 have opposed end portions to be joined by the PTC element 5 and lapped over each other with the PTC element 5 interposed therebetween. The end portions are bonded to the respective surfaces of the PTC element 5 with an electrically conductive adhesive (not shown).

Figure 2:
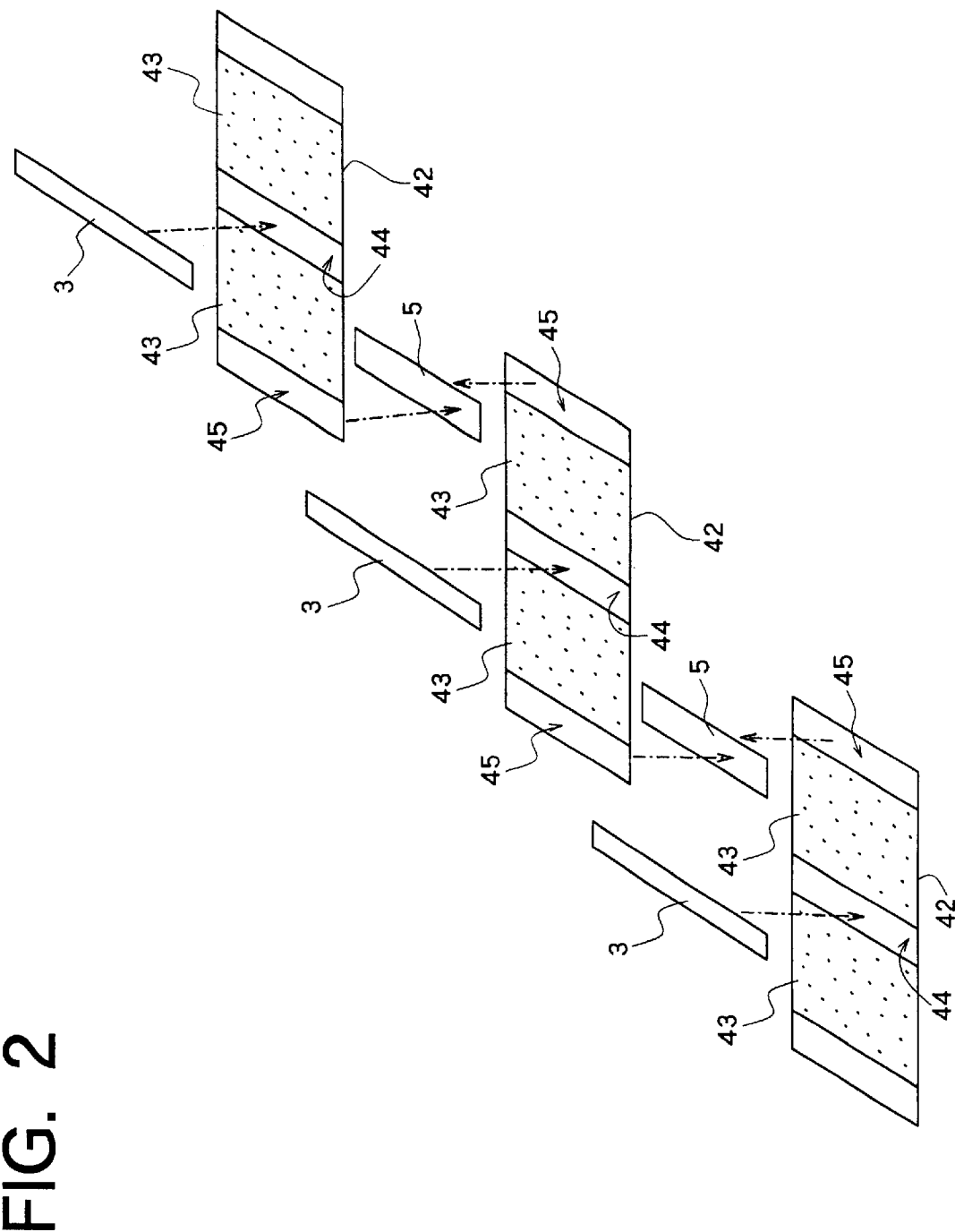
FIG. 2 is a perspective view illustrating a process for preparing the positive electrode.

The positive electrode 4 is prepared by the process shown in FIG. 2. Each of current collector pieces 42 is coated over each surface thereof with an electrode material 43 except where a current collector tab 3 and PTC elements 5 are to be joined thereto to form a first uncoated portion 44 for joining the current collector tab 3 thereto and second uncoated portions 45, 45 at opposite ends each for joining the PTC element 5 thereto. A plurality of positive electrode pieces are obtained in this way.

Next, the current collector pieces 42 are interconnected as arranged adjacent to one another in alignment by interposing the PTC element 5 between the opposed second uncoated portions 45, 45 of each pair of adjacent current collector pieces 42, 42 and bonding the PTC element 5 to the second uncoated portions 45 with an electrically conductive adhesive.

Current collector tabs 3 are thereafter lapped, each at its base end portion, over the respective first uncoated portions 44 of the current collector pieces 42 and joined to the portions 44 as by laser welding or ultrasonic welding.

Figure 6:
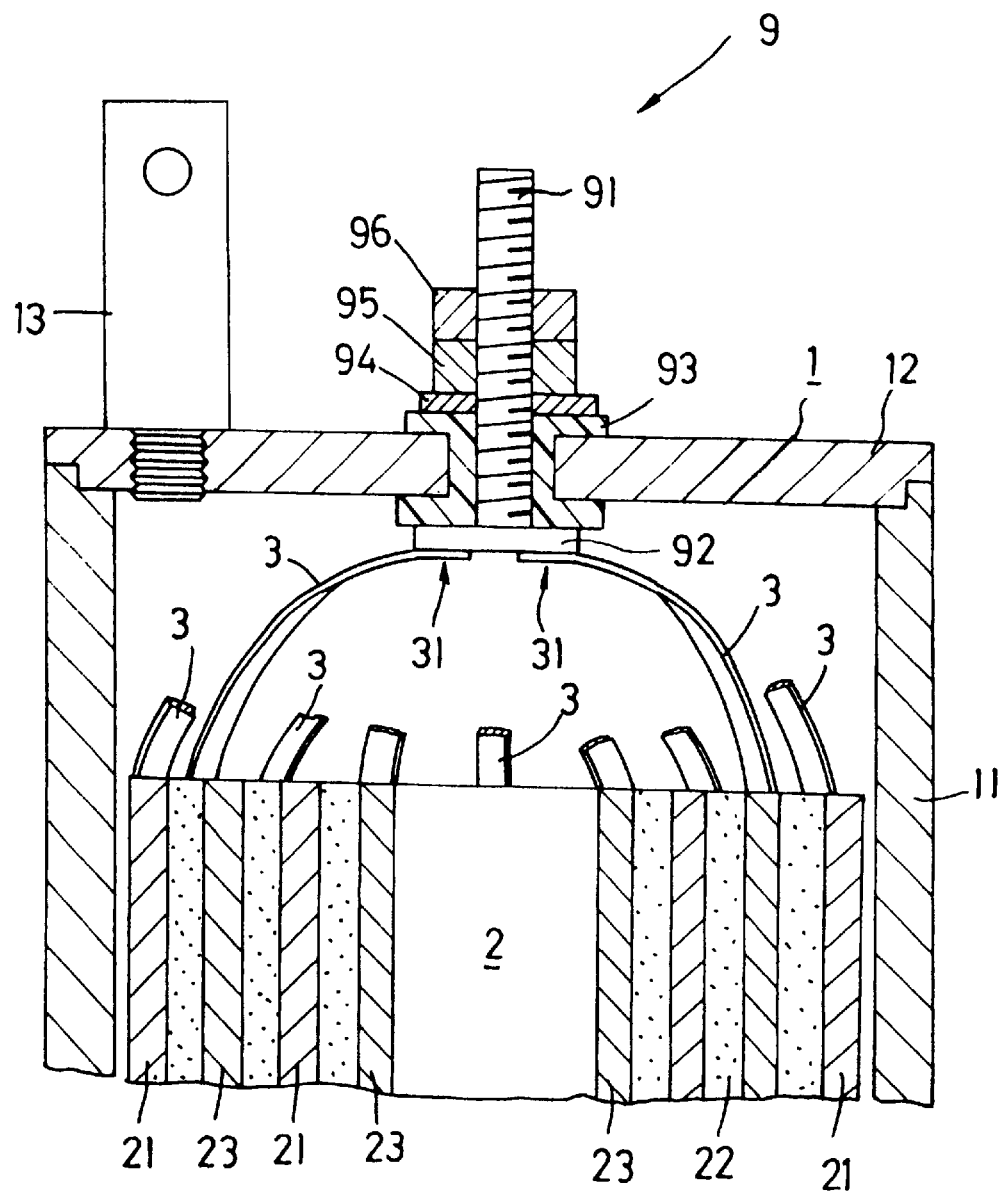
FIG. 6 is a fragmentary view in section of the cylindrical secondary cell.
Figure 7:
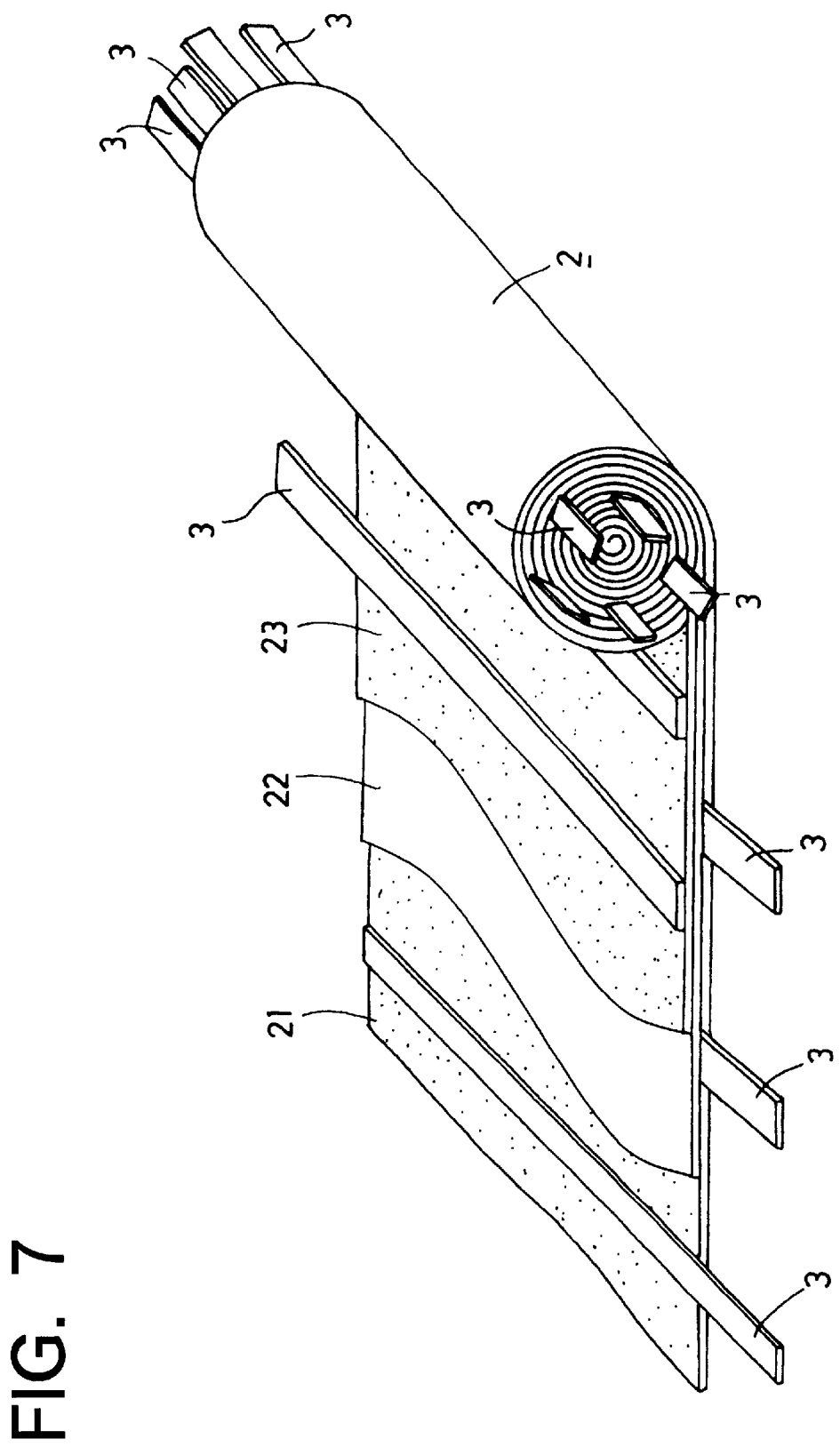
FIG. 7 is a perspective view partly in development of a rolled-up electrode unit.
Figure 8:
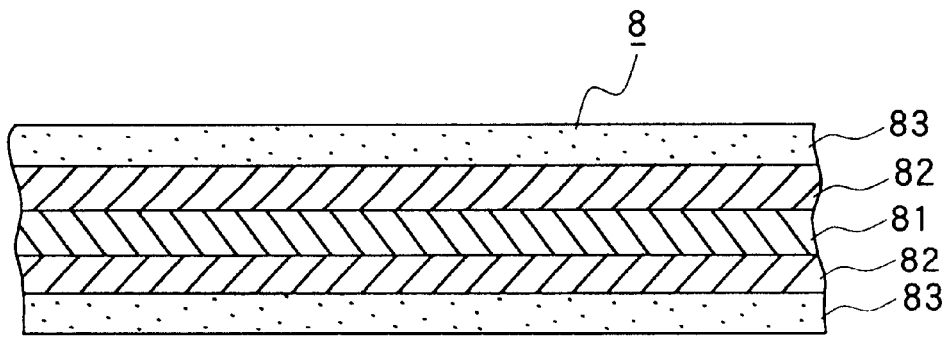
FIG. 8 is a view in section of a conventional positive electrode having a PTC element layer.

In the same manner as in the prior art with the exception of using the positive electrode 4 thus prepared, a rolled-up electrode unit 2 like the one shown in FIG. 7 is fabricated and then housed in a cell can 1 as shown in FIG. 6 to complete a cylindrical lithium secondary cell.

The PTC element 5 can be prepared from a crystalline synthetic resin crosslinked with a silane compound crosslinking agent and containing electrically conductive filler dispersed in the resin. Examples of useful synthetic resins include high-density polyethylene, polypropylene, nylon, polyacetal, polyvinyl chloride, polyvinylidene chloride, polyvinylidene fluoride, polytetrafluoroethylene, and polyethylene terephthalate. Examples of useful conductive inorganic fillers include carbon black and finely divided TiC, BC, CrC, ZrC, TiB, ZrN, TiN, Al and Cu. Examples of useful silane compound crosslinking agents are vinylsilane, epoxysilane, aminosilane, mercaptosilane, etc.

The cylindrical lithium secondary cell of the first embodiment described was checked for performance by the following experiments with the results to be described below.

Experiment 1

Invention Cell A and Comparative Cell X were fabricated in the following manner and checked for characteristics.

[Preparation of Positive Electrode]

A positive electrode composition comprising a positive electrode material ($LiCoO_2$), electrically conductive agent (carbon powder) and binder (fluorocarbon resin powder) was applied to opposite surfaces of aluminum foil (20 μm in thickness) serving as a positive electrode current collector by a doctor blade and dried in a vacuum at 150° C. for 2 hours to prepare three positive electrode pieces (50 mm in width, 500 mm in length and 15 mm in the length of uncoated portion).

[Preparation of Negative Electrode]

A negative electrode composition comprising a negative electrode material (graphite powder) and binder (fluorocarbon resin powder) was applied to opposite surfaces of copper foil (20 μm in thickness) serving as a negative electrode current collector by a doctor blade and dried in a vacuum at 150° C. for 2 hours to prepare a negative electrode (55 mm in width, 1600 mm in length and 5 mm in the length of uncoated portion).

[Preparation of PTC Elements]

To high-density polyethylene (60 wt. %) were added carbon black (40 wt. %) and a silane coupling agent (4 wt. %), and the mixture was kneaded and made into a sheet, which was then cut into pieces, 50 mm in width and 15 mm in length, to obtain PTC elements. The three positive electrode pieces were interconnected by bonding the PTC element to opposed uncoated portions of each pair of adjacent electrode pieces with an electrically conductive adhesive.

[Preparation of Electrolyte]

An electrolyte was prepared by dissolving $LiPF_6$ as a solute in a solvent mixture of ethylene carbonate and diethyl carbonate.

[Assembly of Cells]

The positive electrode and the negative electrode were rolled up with a separator interposed therebetween into a cylinder to prepare a rolled-up electrode unit. The separator used was a finely porous polypropylene membrane having ion permeability. The rolled-up electrode unit was then placed into a cell can, the positive current collector tabs were welded to a positive electrode terminal on the can, the negative current collector tabs were welded to a negative electrode terminal on the can, the electrolyte was further placed in, and the cell can was sealed off to obtain Invention Cell A.

Comparative Cell X was prepared in the same manner as Invention Cell A with the exception of using a positive electrode 50 mm in width, 1500 mm in length and having a PTC element layer (20 μm in thickness) interposed between each surface of a positive electrode current collector and an electrode material.

[Measurement of Cell Characteristics]

The cell of the invention and the comparative cell were checked for discharge capacity by a charge-discharge test under the conditions of: charge current 50 mA, final charge voltage 4.1 V, discharge current 50 mA and final discharge voltage 2.7 V. Table 1 shows the result of a comparison between the two cells in discharge capacity.

TABLE 1

| | DISCHARGE CAPACITY (Ah) |
|---|---|
| INVENTION CELL A | 3.5 |
| COMPARATIVE CELL X | 2.5 |

The result of Table 1 shows that Invention Cell A is greater in discharge capacity and more satisfactory in characteristics than Comparative Cell X. This is thought attributable to the construction of the invention cell that it comprises a plurality of divided electrode pieces which are interconnected by PTC elements, consequently making the cell smaller than the comparative cell in the volume of PTC elements to result in a corresponding increase in the amount of electrode material and a higher energy density.

Experiment 2

Next, Invention Cells B1 to B6 were fabricated to determine the relationship between the number A of current collector pieces for constituting the positive electrode, overall length B of the positive electrode and the length C of PTC elements.

More specifically, Invention Cell B1 was fabricated in the same manner as Invention Cell A with the exception of using two current collector pieces having a length of 75 cm for the positive electrode. Invention Cell B2 was fabricated in the same manner as Invention Cell A with the exception of using five current collector pieces having a length of 30 cm for the positive electrode. Invention Cell B3 was fabricated in the same manner as Invention Cell A with the exception of using ten current collector pieces having a length of 15 cm for the positive electrode. Invention Cell B4 was fabricated in the same manner as Invention Cell A with the exception of using PTC elements having a length of 1 cm. Invention Cell B5 was fabricated in the same manner as Invention Cell A with the exception of using PTC elements having a length of 2 cm. Invention Cell B6 was fabricated in the same manner as Invention Cell A with the exception of using PTC elements having a length of 6 cm.

Table 2 shows the values of the parameter, A×C/B, of Invention Cells A and B1 to B6, and the measurements of discharge capacity of the cells.

ceramic material. Preferably the material is 80° C. to 140° C. in operating temperature. The term the "operating temperature" refers to a temperature at which the resistance value of the material increases to 1000 times the value at room temperature due to the rise of temperature. Preferably, the PTC elements 7 are up to 10Ω·cm in resistivity at 20° C. The PTC elements 7 are preferably in the range of 10 to 500 μm in thickness since this range is favorable with respect to discharge capacity and current cutoff function.

Various positive electrode materials, such as lithium-containing composite oxides (e.g., $LiCoO_2$), conventionally used for nonaqueous electrolyte cells are usable. The positive electrode material is used in the form of a composition prepared by adding an electrically conductive agent such as acetylene black or carbon black and a binder such as

TABLE 2

|  | NUMBER A OF COLLECTOR PIECES | LENGTH B OF ELECTRODE (cm) | LENGTH C OF PCT ELEMENT (cm) | A × C/B (—) | DISCHARGE CAPACITY (Ah) |
|---|---|---|---|---|---|
| INVENTION CELL B1 | 2 | 75 | 1.5 | 0.04 | 3.5 |
| INVENTION CELL A | 3 | 50 | 1.5 | 0.09 | 3.5 |
| INVENTION CELL B2 | 5 | 30 | 1.5 | 0.25 | 3.2 |
| INVENTION CELL B3 | 10 | 15 | 1.5 | 1 | 3.0 |
| INVENTION CELL B4 | 3 | 50 | 1 | 0.06 | 3.5 |
| INVENTION CELL B5 | 3 | 50 | 2 | 0.12 | 3.2 |
| INVENTION CELL B6 | 3 | 50 | 6 | 0.36 | 3.1 |

Table 2 reveals that the cells which are smaller than 0.1 in the parameter, A×C/B, are especially great in discharge capacity. This indicates that the parameter, A×C/B, should preferably be smaller than 0.1.

Second Embodiment

Figure 3:
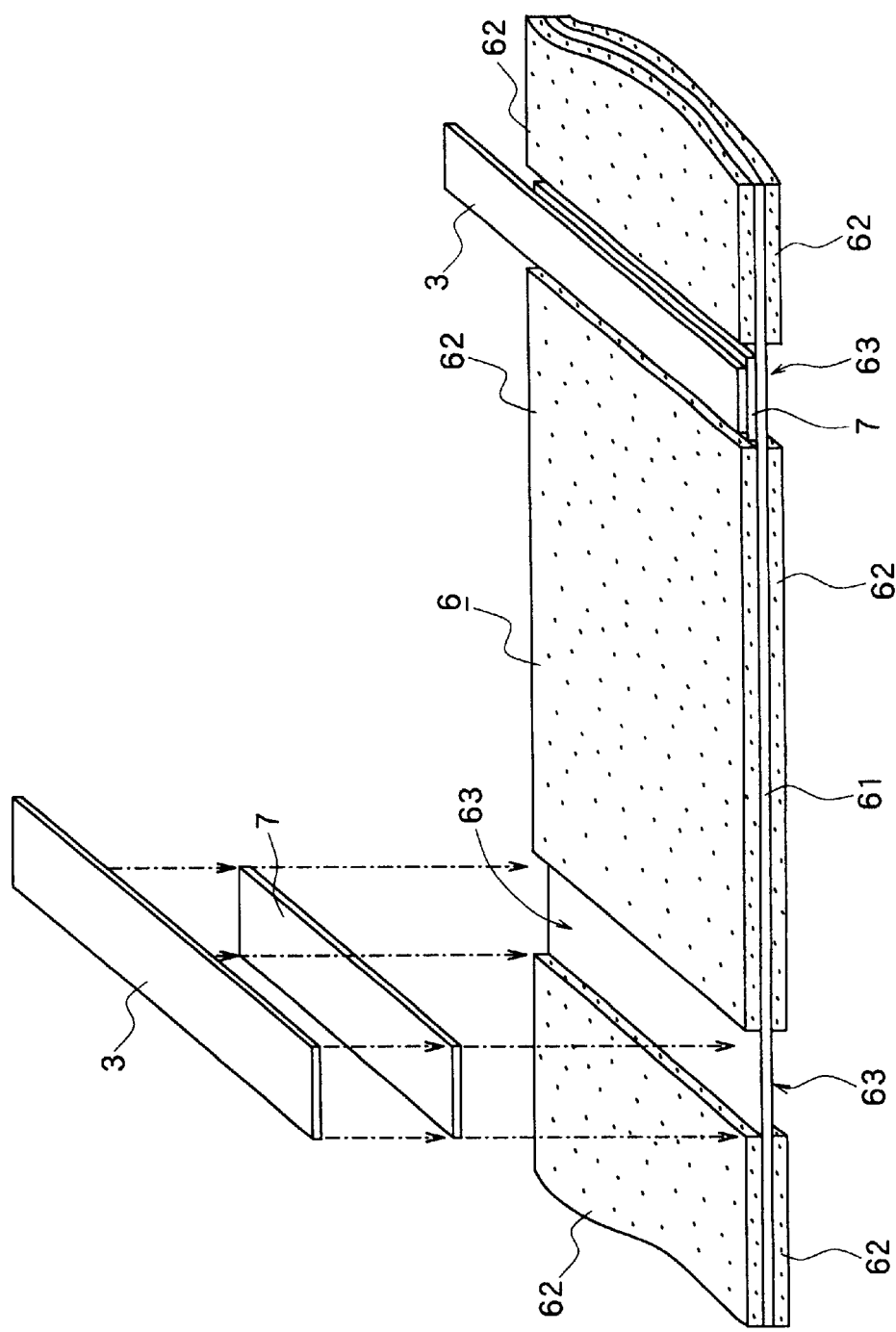
FIG. 3 is a fragmentary perspective view showing a positive electrode for use in another cell as a second embodiment of the invention.

As shown in FIG. 3, the secondary cell of this embodiment has a positive electrode 6, which comprises a current collector 61 in the form of a strip elongated in the direction of winding for forming a rolled-up electrode unit, an electrode material 62 coating opposite surfaces of the current collector 61, and PTC elements 7 each in the form of a strip and joined to uncoated portions 63 of the current collector 61. A current collector tab 3 is joined at its base end portion to the surface of each PTC element 7. In preparing the positive electrode 6, each surface of a current collector 61 is coated with the electrode material 62 except where the PTC elements 7 are to be joined to form uncoated portions 63. Subsequently, current collector tabs 3 are joined to respective PTC elements 7 by ultrasonic welding or laser welding, and the PTC elements 7 are thereafter joined by ultrasonic welding or laser welding to the respective portions 63 of the current collector 61 which are left uncoated with the electrode material 62. The same structure as the positive electrode 6 is used for the negative electrode (not shown).

A rolled-up electrode unit 2 as shown in FIG. 7 is prepared in the same manner as in the prior art with the exception of using the positive electrode and the negative electrode thus fabricated, and the electrode unit 2 is housed in a cell can 1 as shown in FIG. 6 to complete a cylindrical lithium secondary cell.

The PTC elements 7 can be prepared using, for example, an electrically conductive polymer (synthetic resin) or polytetrafluoroethylene (PTFE) or polyvinylidene fluoride (PVdF) to the material, and kneading the mixture. Usable as negative electrode materials are lithium metal, lithium alloys, carbon materials and metallic oxides which can be doped with lithium and capable of releasing lithium.

Various electrolytes including lithium hexafluorophosphate and conventionally used for lithium secondary cells are usable. Separators usable are a wide variety of those conventionally used for lithium secondary cells, such as finely porous membranes of polyethylene or polypropylene having high ion conductivity.

The cylindrical lithium secondary cell of the second embodiment described was checked for performance by the following experiments with the results to be described below.

Experiment 3

Invention Cell A1 and Comparative Cell X1 were fabricated in the following manner and checked for characteristics.

[Preparation of Positive Electrode]

A positive electrode composition was prepared by mixing together a powder of $LiCoO_2$ serving as a positive electrode material, carbon powder serving as an electrically conductive agent and polyvinylidene fluoride (PVdF) serving as a binder in the ratio by weight of 90:5:5.

Subsequently N-methyl-2-pyrrolidone was added to the positive electrode composition to obtain a slurry, which was then applied to aluminum foil serving as a positive electrode current collector. The coated foil was thereafter rolled and cut to a width of 240 mm to prepare a positive electrode.

[Preparation of Negative Electrode]

A powder of natural graphite serving as a negative electrode material and polyvinylidene fluoride (PVdF) serving as a binder were mixed together in the ratio by weight of 90:10 to obtain a negative electrode composition.

Subsequently N-methyl-2-pyrrolidone was added to the composition to obtain a slurry, which was then applied to copper foil serving as a negative electrode current collector. The coated foil was thereafter rolled and cut to a width of 250 mm to prepare a negative electrode.

[Preparation of Electrolyte]

Ethylene carbonate (EC) and diethyl carbonate (DEC) were mixed together in equal volumes to obtain a solvent mixture, in which was dissolved lithium hexafluorophosphate in the ratio of 1 mole/liter to prepare an electrolyte.

[Assembly of Cells]

PTC elements having a thickness of 100 μm and current collector tabs of aluminum lapped over the respective elements were placed on the positive electrode current collector with the PTC elements in contact with the respective uncoated portions, and joined to the collector as by ultrasonic welding. Similarly PTC elements having a thickness of 100 μm and current collector tabs of nickel were are lapped over the current collector of the negative electrode and joined thereto as by ultrasonic welding. Incidentally, ten current collector tabs were attached as arranged at equal spacings to each of the positive electrode and the negative electrode.

Invention Cell A1, 60 mm in diameter and 290 mm in height, was fabricated using a separator in the form of a finely porous membrane of polyproplylene, etc. in addition to the positive and negative electrodes and the electrolyte.

A positive electrode and a negative electrode were prepared each by affixing a sheet of PTC element having a thickness of 20 μm to each of opposite surfaces of a current collector and thereafter coating opposite surfaces of the resulting assembly with a positive or negative electrode composition. Current collector tabs were attached to the electrodes, and Comparative Cell X1 was thereafter fabricated in the same manner as Invention Cell A1.

[Measurement of Cell Characteristics]

Invention Cell A1 and Comparative Cell X1 were checked for discharge capacity by charging each cell with a current of 10 A to a cell voltage of 4.2 V and thereafter discharging the cell to 2.7 V. Table 3 shows the results.

TABLE 3

| CELL | DISCHARGE CAPACITY (Ah) |
|------|-------------------------|
| A1   | 70                      |
| X1   | 40                      |

Table 3 reveals that Invention Cell A1 has a greater discharge capacity than Comparative Cell X1, this substantiating the usefulness of the cell of the invention.

Experiment 4

Invention Cells A2 to A6 were fabricated in this experiment to investigate the influence of the thickness of the PTC element on the discharge capacity of the cell.

Invention Cells A2 to A6 were fabricated in the same manner as Invention Cell A1 with the exception of using PTC elements with a thickness of 10 μm for Cell A2, of 50 μm for Cell A3, of 200 μm for Cell A4, of 500 μm for Cell A5 and of 1000 μm for Cell A6.

Invention Cells A2 to A6 were checked for discharge capacity by charging each cell with a current of 10 A to a cell voltage of 4.2 V and thereafter discharging the cell to 2.7 V. Table 4 shows the results.

TABLE 4

| CELL | THICKNESS OF PTC ELEMENT (μm) | DISCHARGE CAPACITY (Ah) |
|------|-------------------------------|-------------------------|
| A2   | 10                            | 71                      |
| A3   | 50                            | 70                      |
| A1   | 100                           | 70                      |
| A4   | 200                           | 69                      |
| A5   | 500                           | 65                      |
| A6   | 1000                          | 60                      |

Table 4 reveals that the cells are excellent in discharge capacity when the PTC elements therein are in the range of 10 μm to 500 μm in thickness. It is desirable that the thickness of the PTC elements be in this range further because PTC elements having a thickness less than 10 μm are difficult to prepare. The table further shows that the PTC elements are more preferably in the range of 10 μm to 200 μm in thickness.

According to both the first and second embodiments described, the PTC elements occupy a smaller volume within the cell can than is the case with the conventional cell, consequently permitting use of an increased amount of electrode material. A decrease in the power loss due to the electric resistance of the PTC elements results in a greater discharge capacity.

For example, the cell of the invention according to the first embodiment has a discharge capacity of 3.5 Ah as compared with the comparative cell which is 2.5 Ah in discharge capacity, thus exhibiting an increase of 40%. Further the cell of the invention according to second embodiment has a discharge capacity of 70 Ah in contrast with the discharge capacity of the comparative cell which is 40 Ah, hence an increase of 75%. The increases in discharge capacity appear attributable to increases in the amount of electrode material and to reductions in power loss due to electric resistance. Especially when the electrode area increases, the power loss due to electric resistance presumably decreases more effectively.

Third Embodiment

Figure 4:
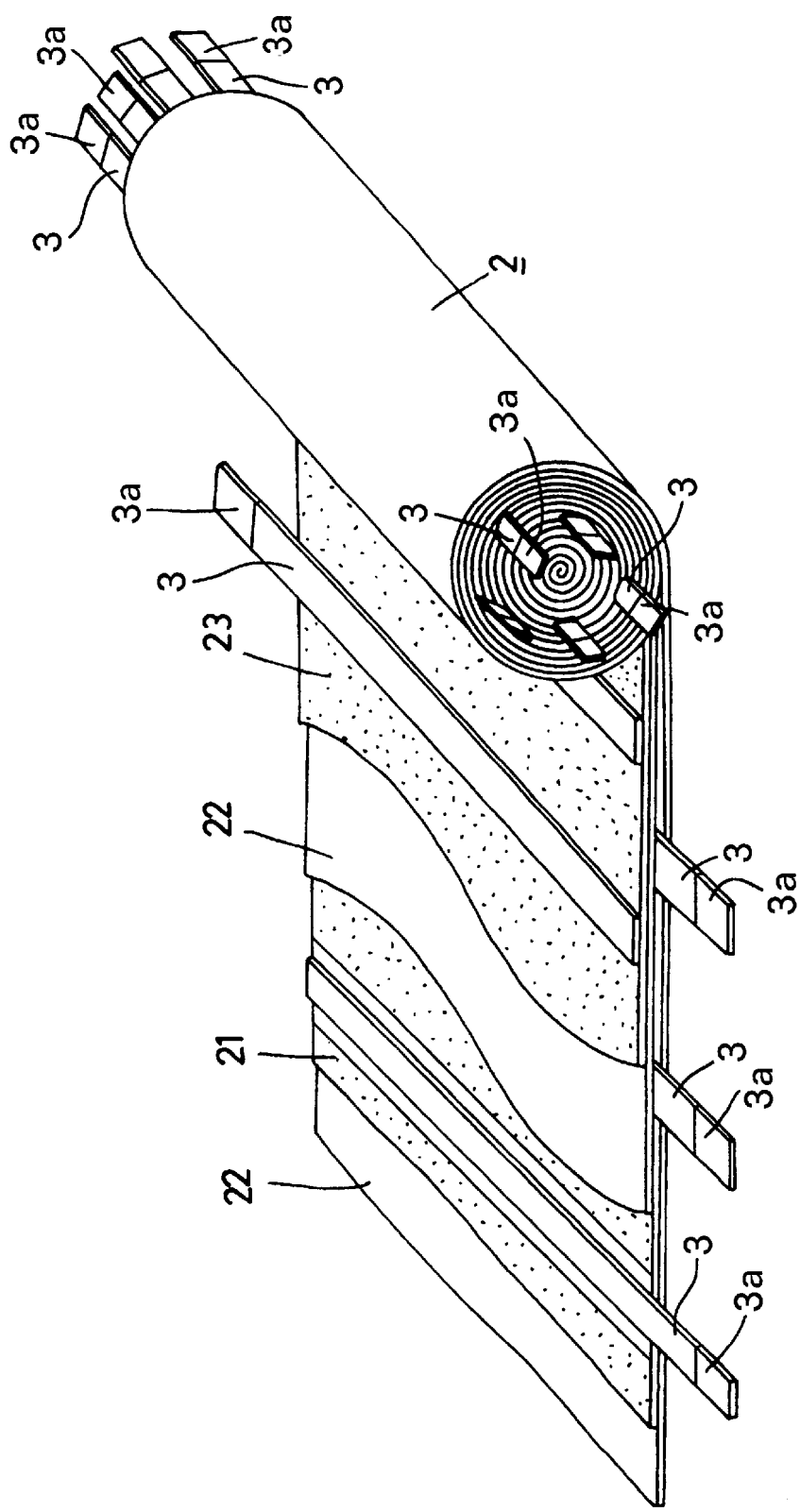
FIG. 4 is a perspective view partly in development of a rolled-up electrode unit for use in another cell as a third embodiment.

The secondary cell of this embodiment has a plurality of current collector tabs 3 shown in FIG. 7 and each comprising a PTC element in its entirety. Alternatively, each current collector tab 3 can be made of a PTC element only at its outer end 3a as shown in FIG. 4.

When the temperature of one of the current collector tabs 3 of this secondary cell rises to the operating temperature or higher, the electric resistance of the tab with the rise in temperature increases rapidly, permitting little or no current to flow through the tab, whereby the cell current is cut off.

While one PTC element has an allowable current value, for example, of about 5 A, a plurality of PTC elements are connected in parallel according to the invention, so that the cell can be charged at a large current value obtained by multiplying the allowable current value of the PTC element by the number of PTC elements. Further the plurality of current collector tabs 3 are arranged on each of the positive electrode 23 and the negative electrode 21, as distributed longitudinally thereof. Accordingly, when a temperature rise occurs at a location along the length of the positive electrode 23 or negative electrode 21, the electric resistance of the current collector tab 3 in the vicinity of the location rapidly increases to block the flow of current through the tab 3 almost completely, thus effecting rapid current cutoff.

Next, a description will be given of a test conducted to substantiate the advantage of the present embodiment wherein the current collector tabs each comprise a PTC element.

[Preparation of Rolled-up Electrode Units]

Rolled-up electrode units were prepared for Invention Cells C1, C2 and Comparative Cell Y each by placing a positive electrode over a finely porous polyethylene membrane having ion permeability and serving as a separator, arranging ten positive electrode current collector tabs on the positive electrode, placing a separator and a negative electrode successively over the positive electrode and the tabs, then arranging ten negative electrode current collector tabs on the negative electrode, and rolling up the resulting assembly into a winding of many turns. The current collector tabs to be described below were used for Cells C1, C2 and Y.

The positive and negative electrode current collector tabs used for Invention Cell C1 were PTC elements (operable at an ambient temperature of 60° C. and current of 2.65 A) having a length of 10 mm along the electrode winding direction, a thickness of 0.5 mm and width of 300 mm.

The positive electrode current collector tabs used for Invention Cell C2 were each 300 mm in width and prepared by connecting a PTC element (operable at an ambient temperature of 60° C. and current of 2.65 A) having a length of 10 mm, a thickness of 0.5 mm and a width of 10 mm to an aluminum strip having a length of 10 mm, a thickness of 0.1 mm and a width of 290 mm with an electrically conductive adhesive. The negative electrode current collector tabs used for Cell C2 were each 300 mm in width and prepared by connecting a PTC element of the same size and same type as the above PTC element to a nickel strip having a length of 10 mm, a thickness of 0.1 mm and a width of 290 mm with an electrically conductive adhesive. The positive and negative electrode current collector tabs were arranged on the respective positive and negative electrodes so as to project the PTC element portions outward beyond the electrodes.

Further used for Comparative Cell Y were aluminum strips having a length of 10 mm, a thickness of 0.1 mm and a width of 300 mm as positive electrode current collector tabs and nickel strips of the same size as the aluminum strips to serve as negative electrode current collector tabs.

[Assembly of Cells]

Invention Cells C1, C2 and Comparative Cell Y were each assembled by attaching a positive electrode outer terminal and a negative electrode outer terminal respectively to two aluminum closure plates having a diameter of 64 mm and a thickness of 5 mm, placing the rolled-up electrode unit into an aluminum cylinder serving as a cell can and measuring 64 mm in outside diameter, 300 mm in height and 2 mm in wall thickness, securing the two closure plates to the cylinder by welding and thereafter placing an electrolyte into the cell can to complete a large cylindrical lithium cell which was 3.6 V in average output voltage and 70 Ah in cell capacity (⅛ C discharge).

Attached to each closure plate of Comparative Cell Y was a PTC element (operable at an ambient temperature of 60° C. and current of 20 A) having a diameter of 30 mm and thickness of 1 mm.

Experiment 5

Invention Cells C1, C2 and Comparative Cell Y were placed into a constant-temperature chamber having an atmosphere of 20° C. and charged at 20 A, and the time required for the resistance value of the PTC element of each cell to reach $1\times10^2\Omega$ after placement into the chamber was measured. The results are given in Table 5.

TABLE 5

| CELL | TIME REQUIRED (min) | CHARGING |
| --- | --- | --- |
| C1 | NO CHANGE IN RESISTANCE | YES |
| C2 | NO CHANGE IN RESISTANCE | YES |
| Y | 0.5 | NO |

Table 5 reveals that Invention Cells C1, C2 were chargeable during the measurement with the PTC element remaining unchanged in resistance value, whereas Comparative Cell Y became no longer chargeable upon the resistance value of the PTC element reaching $1\times10^2\Omega$ in 0.5 minute. These results indicate that the secondary cells of the invention wherein PTC elements were used for the current collector tabs can be charged with a relatively great current.

The cells of the present invention are not limited to the foregoing embodiments in construction but can be modified variously by one skilled in the art without departing from the spirit of the invention as set forth in the appended claims. Although the invention is embodied as cylindrical secondary cells according to the foregoing embodiments, these cells are not limitative but the invention can of course be embodied as nonaqueous electrolyte secondary cells of various shapes, for example, flat, and rectangular or square shapes.

What is claimed is:

1. A nonaqueous electrolyte secondary cell comprising an electrode unit housed in a cell can, and a plurality of current collector tabs connecting the electrode unit to an electrode terminal assembly attached to the cell can for delivering the electric power generated by the electrode unit to an external device from the electrode terminal assembly, each of the current collector tabs being partly or entirely formed of an element having a positive temperature coefficient of resistance.

* * * * *